US012521866B2

(12) United States Patent
Kao

(10) Patent No.: US 12,521,866 B2
(45) Date of Patent: Jan. 13, 2026

(54) SOCKET HOLDING FRAME

(71) Applicant: Jui Chien Kao, Taichung (TW)

(72) Inventor: Jui Chien Kao, Taichung (TW)

( * ) Notice: Subject to any disclaimer, the term of this patent is extended or adjusted under 35 U.S.C. 154(b) by 150 days.

(21) Appl. No.: 18/357,583

(22) Filed: Jul. 24, 2023

(65) Prior Publication Data

US 2025/0033187 A1 Jan. 30, 2025

(51) Int. Cl.
*B25H 3/00* (2006.01)

(52) U.S. Cl.
CPC .................................... *B25H 3/003* (2013.01)

(58) Field of Classification Search
CPC . B25H 3/003; B25H 3/00; B25H 3/04; B25H 3/06
USPC ............... 206/349, 378, 377, 376, 493, 379; 211/70.6, 69, 49.1; 81/438; 403/361
See application file for complete search history.

(56) References Cited

U.S. PATENT DOCUMENTS 4,337,860 A * 7/1982 Carrigan ................ B25H 3/003 211/49.1
5,467,874 A * 11/1995 Whitaker ................ B25H 3/06 248/309.2
5,645,177 A * 7/1997 Lin .......................... B25H 3/04 211/69.5
6,032,797 A * 3/2000 Kao ......................... B25H 3/04 206/349
6,712,225 B2 * 3/2004 McNeely ............... B25H 3/003 206/378
6,991,105 B2 * 1/2006 Winnard ................ B25H 3/003 206/378
7,152,747 B2 * 12/2006 Wang .................... A47F 5/0006 211/70.6
7,374,042 B2 * 5/2008 Liu ........................ B25H 3/003 206/372
7,753,216 B2 * 7/2010 Kao ......................... B25H 3/04 211/70.6
8,499,935 B2 * 8/2013 Hsieh ....................... B25H 3/04 206/349
8,955,698 B2 * 2/2015 Hsieh ..................... B25H 3/003 206/378
9,186,790 B1 * 11/2015 Kao ....................... B25H 3/003
9,247,832 B2 * 2/2016 Chang ...................... B25H 3/04
9,527,206 B1 * 12/2016 Hsieh ....................... B25H 3/04
(Continued)

FOREIGN PATENT DOCUMENTS

TW I551409 B 10/2016

*Primary Examiner* — Steven A. Reynolds
*Assistant Examiner* — Prince Pal
(74) *Attorney, Agent, or Firm* — Withrow + Terranova, PLLC; Vincent K. Gustafson

(57) ABSTRACT

A socket holding frame has a track base and a socket holding mount. The track base has a positioning panel having multiple round locking holes arranged at spaced interval and aligned in a straight line and two side racks respectively located at two opposite sides of the positioning panel. Each side rack has a sliding channel. The socket holding mount has a round flange extending into the sliding channels of the two side racks, a holding portion formed from a top of the flange, and a positioning protrusion extending out of a bottom surface of the flange and being coaxial with the flange. The positioning protrusion is selectively mounted into one of the locking holes. The socket holding mount is rotatable relative to the track base around the positioning protrusion.

12 Claims, 9 Drawing Sheets

(56) References Cited

U.S. PATENT DOCUMENTS 9,528,303 B1 * 12/2016 Lai ........................ A47F 5/0861
9,538,862 B2 * 1/2017 Kao ........................ F16M 13/02
9,539,721 B1 * 1/2017 Kao ........................ B25H 3/003
9,604,771 B1 * 3/2017 Chen .................. B65D 73/0064
9,656,385 B1 * 5/2017 Kao ...................... A47F 7/0035
9,662,781 B1 * 5/2017 Kao ........................ B25H 3/003
9,694,491 B1 * 7/2017 Kao ........................ B25H 3/003
9,782,890 B2 * 10/2017 Hsieh ........................ B25H 3/04
9,821,451 B1 * 11/2017 Kao ........................ B25H 3/04
9,878,441 B1 * 1/2018 Kao ........................ B25H 3/003
9,925,657 B1 * 3/2018 Kao ........................ B25H 3/04
9,956,681 B2 * 5/2018 Kao ........................ B25H 3/04
9,962,827 B2 * 5/2018 Kao ........................ B25H 3/04
10,022,857 B2 * 7/2018 Kao ........................ B25H 3/04
10,632,606 B1 * 4/2020 Wang ...................... B25H 3/006
10,792,803 B1 * 10/2020 Kao ........................ B25H 3/003
11,007,625 B2 * 5/2021 Chen .................. B25B 23/0028
11,090,799 B2 * 8/2021 Wang ...................... B25H 3/003
11,253,988 B1 * 2/2022 Hsieh ........................ B25H 3/04
11,389,945 B1 * 7/2022 Kao ........................ B25H 3/04
11,420,320 B2 * 8/2022 Chang .................... B25H 3/003
11,826,895 B2 * 11/2023 Winnard ................ A61K 39/12
11,986,944 B1 * 5/2024 Kao ........................ B25H 3/04
2003/0150824 A1 * 8/2003 McNeely ............... B25H 3/003
206/378
2005/0218023 A1 * 10/2005 Winnard ................ B25H 3/003
206/378
2005/0221664 A1 * 10/2005 Winnard ................ B25H 3/003
439/510
2005/0247653 A1 * 11/2005 Brooks ................. A47F 5/0846
211/94.01
2006/0207951 A1 * 9/2006 Wang .................... A47F 5/0006
211/70.6
2006/0254940 A1 * 11/2006 Mu ........................ B25H 3/003
206/378
2007/0012587 A1 * 1/2007 Wang ..................... B25H 3/003
206/349
2007/0023307 A1 * 2/2007 Liu ........................ B25H 3/003
206/372
2008/0047911 A1 * 2/2008 Kao ...................... A47F 5/0838
211/70.6
2008/0157489 A1 * 7/2008 Kao ........................ B25H 3/003
279/97
2010/0065520 A1 * 3/2010 Hsieh ........................ B25H 3/06
211/70.6
2010/0108562 A1 * 5/2010 Chen ...................... B25G 1/085
206/349
2011/0089126 A1 * 4/2011 Hsieh ........................ B25H 3/06
211/70.6
2012/0061339 A1 * 3/2012 Chang ................ B65D 73/0064
211/70.6
2012/0096698 A1 * 4/2012 Ernst ........................ B25H 3/04
403/360
2013/0068643 A1 * 3/2013 Hsieh ........................ B25H 3/04
206/349
2014/0209780 A1 * 7/2014 Chang .................. F16M 13/005
248/551
2015/0165615 A1 * 6/2015 Lee ........................ B25H 3/003
206/349
2016/0096264 A1 * 4/2016 Kao ........................ B25H 3/06
206/378
2017/0043475 A1 * 2/2017 Hsieh ........................ B25H 3/04
2017/0232606 A1 * 8/2017 Kao ........................ B25H 3/003
211/70.6
2017/0259408 A1 * 9/2017 Zhang ..................... B25B 13/06
2017/0361453 A1 * 12/2017 Kao ........................ B25H 3/003
2018/0065792 A1 * 3/2018 Chen ...................... B25H 3/003
2018/0209483 A1 * 7/2018 Yu ....................... B25B 23/0014
2019/0091842 A1 * 3/2019 Chou ...................... B25B 13/06
2019/0366531 A1 * 12/2019 Hu ........................... B25H 3/04
2020/0016736 A1 * 1/2020 Kao ........................ B25H 3/003
2020/0072294 A1 * 3/2020 Chen .......................... F16D 3/20
2020/0101590 A1 * 4/2020 Winnard ................ B25H 3/003
2021/0060761 A1 * 3/2021 Chang .................... B25H 3/003
2021/0156434 A1 * 5/2021 Yu ......................... F16D 3/2057
2022/0080576 A1 * 3/2022 Chen ...................... B25H 3/003
2023/0020327 A1 * 1/2023 Herritz ................... B25H 3/003
2023/0219209 A1 * 7/2023 Chang .................... B25H 3/003
2023/0219210 A1 * 7/2023 Chang .................... B25H 3/003
206/349
2023/0234194 A1 * 7/2023 Hsieh .................. B25B 23/0035
81/121.1
2024/0157541 A1 * 5/2024 Kao ........................ B25H 3/003
2025/0033187 A1 * 1/2025 Kao ........................ B25H 3/003

* cited by examiner

SOCKET HOLDING FRAME

BACKGROUND OF THE INVENTION

1. Field of the Invention

The present invention relates to a socket holding frame, and more particularly to a socket holding frame that facilitates a socket mounted on the socket holding frame to be rotatable or movable thereon.

2. Description of Related Art

A conventional socket holding frame has a track base and multiple socket holding mounts mounted on the track base. Each socket holding mount is used to hold a socket on the track base. To allow a user to adjust a position of the socket relative to the track base, each socket holding mount is slidable relative to the track base. To allow the user to look for the marks of sizes or model numbers on outer peripheries of the sockets, each socket holding mount is rotatable relative to the track base for adjusting an orientation of the socket mounted on the socket holding mount relative to the track base.

However, to move or rotate the sockets easily and quickly, the track base and the socket holding mounts do not have any fixing structure for fixing the socket holding mounts with the track base in positions. Hence, the socket holding mounts may be moved or rotated by external or unexpected impacts and cannot be firmly secured on the track base in position. Accordingly, the conventional socket holding frame provides a poor positioning effect.

To overcome the shortcomings of the conventional socket holding frame, the present invention provides a socket holding frame to mitigate or obviate the aforementioned problems.

SUMMARY OF THE INVENTION

The present invention relates to a socket holding frame that provides a firm positioning effect and facilitates a socket mounted on the socket holding frame to rotate or to move around a central axis.

The socket holding frame comprises a track base and a socket holding mount. The track base has a positioning panel and two side racks respectively located at two opposite sides of the positioning panel. The positioning panel is elongated and has multiple round locking holes arranged at spaced intervals and aligned in a straight line. Each side rack has an upper rail panel located higher than the positioning panel, a lower rail panel, and a sliding channel formed between the upper rail panel and the lower rail panel and having an opening facing toward and communicating with the opening of the sliding channel of the other one of the two side racks. The socket holding mount is slidably and rotatably mounted on the track base and has a round flange, a holding portion, and a positioning protrusion. The flange is disposed between the upper rail panels and the lower rail panels of the two side racks and extends into the sliding channels of the two side racks via diametrical opposite sides of the flange, respectively, and is slidable relative to the sliding channels of the two side racks along the sliding channels. The holding portion is formed on and protrudes upwardly from a top of the flange and is configured to hold a socket. The positioning protrusion is formed at a bottom of the socket holding mount, extends out of a bottom surface of the flange, is coaxial with the flange, and is selectively mounted into one of the locking holes. The socket holding mount is rotatable relative to the track base around the positioning protrusion mounted into said one of the locking holes.

Other objects, advantages, and novel features of the invention will become more apparent from the following detailed description when taken in conjunction with the accompanying drawings.

BRIEF DESCRIPTION OF THE DRAWINGS

FIG. 5 is a cross sectional bottom view of the socket holding mount in

FIG. 3; and

DETAILED DESCRIPTION OF PREFERRED EMBODIMENT

Figure 1:
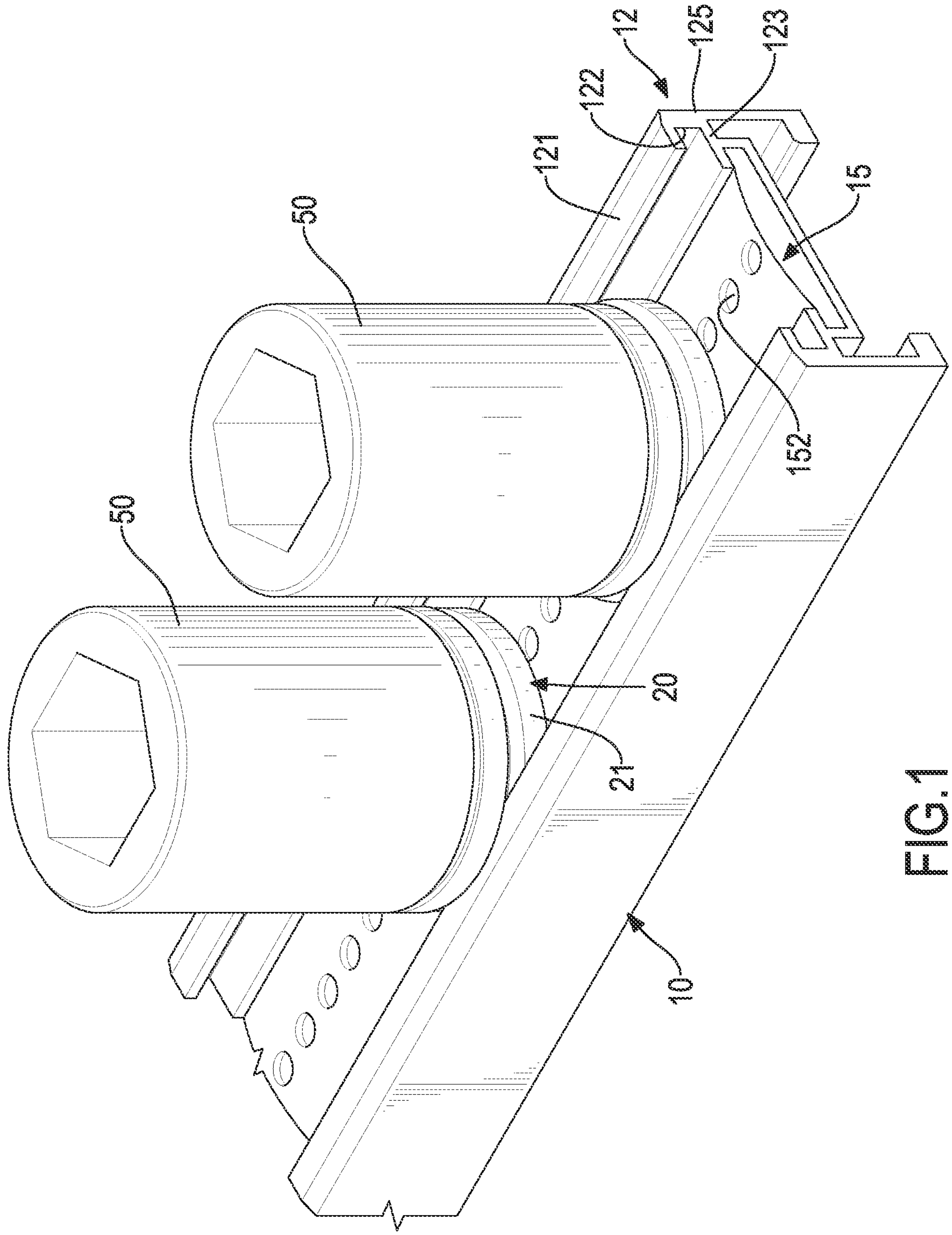
FIG. 1 is an enlarged perspective view of a first embodiment of a socket holding frame in accordance with the present invention and shows sockets mounted thereon.
Figure 2:
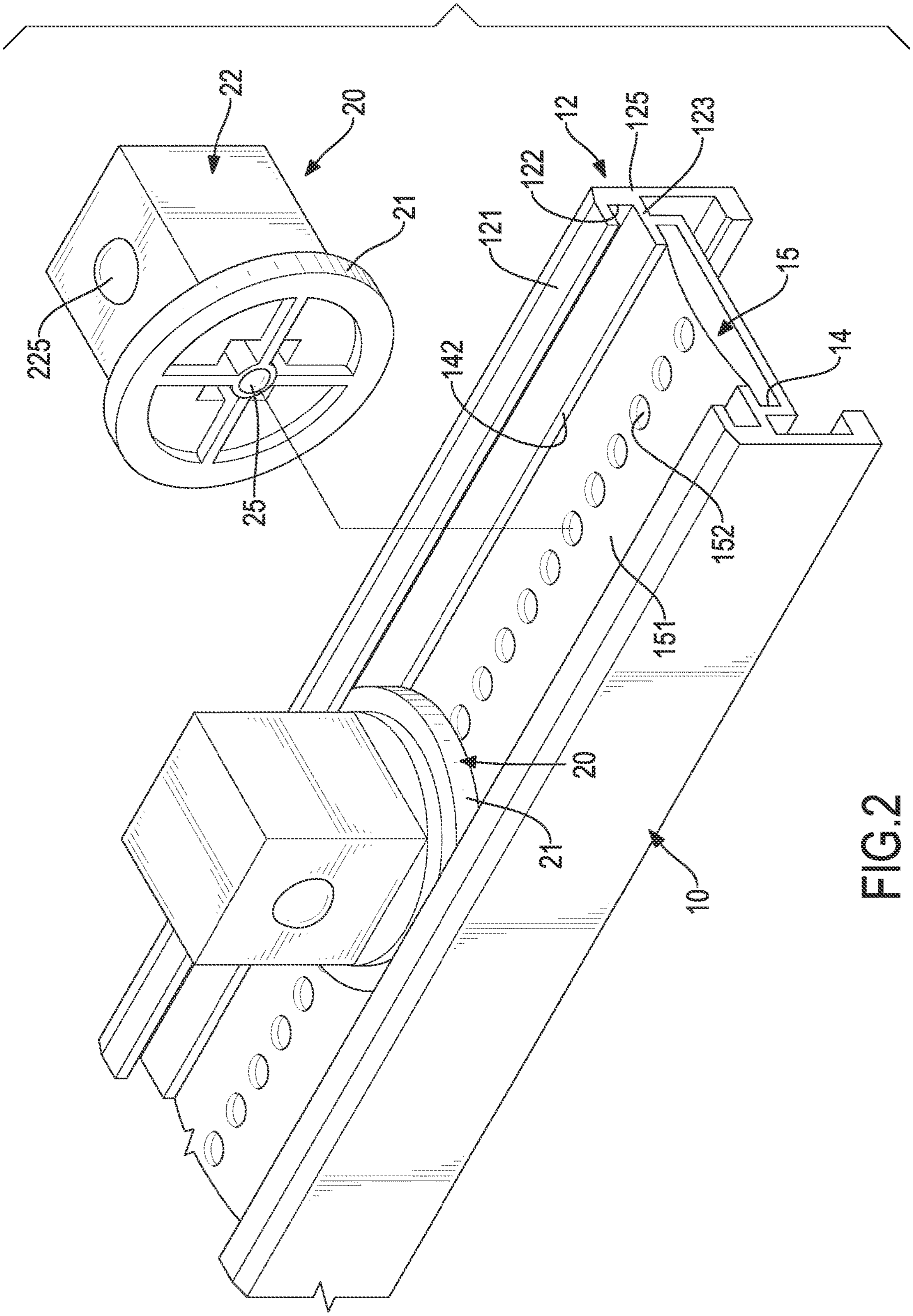
FIG. 2 is an enlarged exploded perspective view of the socket holding frame in FIG. 1.

With reference to FIGS. 1 to 5, a first embodiment of a socket holding frame in accordance with the present invention comprises a track base 10 and a socket holding mount 20.

The track base 10 is made of metal, is preferably made of aluminum, is elongated, and has a positioning panel 15 and two side racks 12. The positioning panel 15 is elongated and has multiple round locking holes 152 formed in the positioning panel 15 at spaced intervals and aligned in a straight line. The two side racks 12 are respectively located at two opposite sides of the positioning panel 15. Each side rack 12 has an upper rail panel 121, a lower rail panel 123, and a sliding channel 122 formed between the upper rail panel 121 and the lower rail panel 123. The sliding channels 122 of the two side racks 12 have side openings facing toward each other and communicating with each other. The upper rail panel 121 and the lower rail panel 123 of each side rack 12 are connected by a connecting panel 125 located at a side of the side rack 12 facing away the other one of the side racks 12. The locking holes 152 are located between the two side racks 12. Each locking hole 152 may be a blind hole.

The socket holding mount 20 is slidably and rotatably mounted on the track base 10 and has a round flange 21, a holding portion 22, and a positioning protrusion 25. The flange 21 is disposed between the upper rail panels 121 and the lower rail panels 123 of the two side racks 12, extends into the sliding channels 122 of the two side racks 12 via diametrical opposite sides thereof, respectively, and is slidable relative to the track base 10 along the sliding channels 122. The holding portion 22 is formed on and protrudes upwardly from a top of the flange 21 and is configured to hold the socket 50. The holding portion 22 is rectangular and has an engaging ball 225 extending outwardly from a side surface of the holding portion 22. The positioning protrusion 25 is formed at a bottom of the socket holding mount 20, extends out of a bottom surface of the flange 21, and is coaxial with the flange 21. The positioning protrusion 25 is selectively mounted into one of the locking holes 152 to engage with the locking hole 152 and to keep the socket holding mount 20 in position. The socket holding mount 20 is rotatable relative to the track base 10 around the positioning protrusion 25 mounted into one of the locking holes 152. Preferably, a lower end of the positioning protrusion 25 is convex for the socket holding mount 20 to be easily slid by a user.

In the first embodiment, an assembling cavity 14 is located lower than the two side racks 12. An upper opening 142 is formed between the lower rail panels 123 of the two side racks 12 and communicates with the assembling cavity 14. The positioning panel 15 is an elongated panel disposed in the assembling cavity 14 and may be flexible and made of a plastic material. The positioning panel 15 has an abutting portion 151 having a convex surface facing upward and extending into the upper opening 142. The locking holes 152 are recessed in the abutting portion 151 of the positioning panel 15. Preferably, a highest point of the abutting portion 151 is located higher than top surfaces of the lower rail panels 123 of the two side racks 12 and abuts against the bottom surface of the flange 21 of the socket holding mount 20 to push the flange 21 upwardly to tightly abut against bottom surfaces of the upper rail panels 121 of the two side racks 12. The positioning protrusion 25 is able to extend into one of the locking holes 152 in the abutting portion 151 of the positioning panel 15 to keep the socket holding mount 20 in position. The assembling cavity 14 has two insertion channels 144 respectively located at two opposite sides of the assembling cavity 14 and respectively located below the two lower rail panels 123 of the two side racks 12. The positioning panel 15 has two insertion portions 153 respectively formed on two opposite sides of the abutting portion 151 and respectively inserted into the two insertion channels 144. The positioning panel 15 has a cavity 154 formed in a bottom at a middle thereof and recessed upwardly and extending longitudinally to enhance flexibility.

Figure 3:
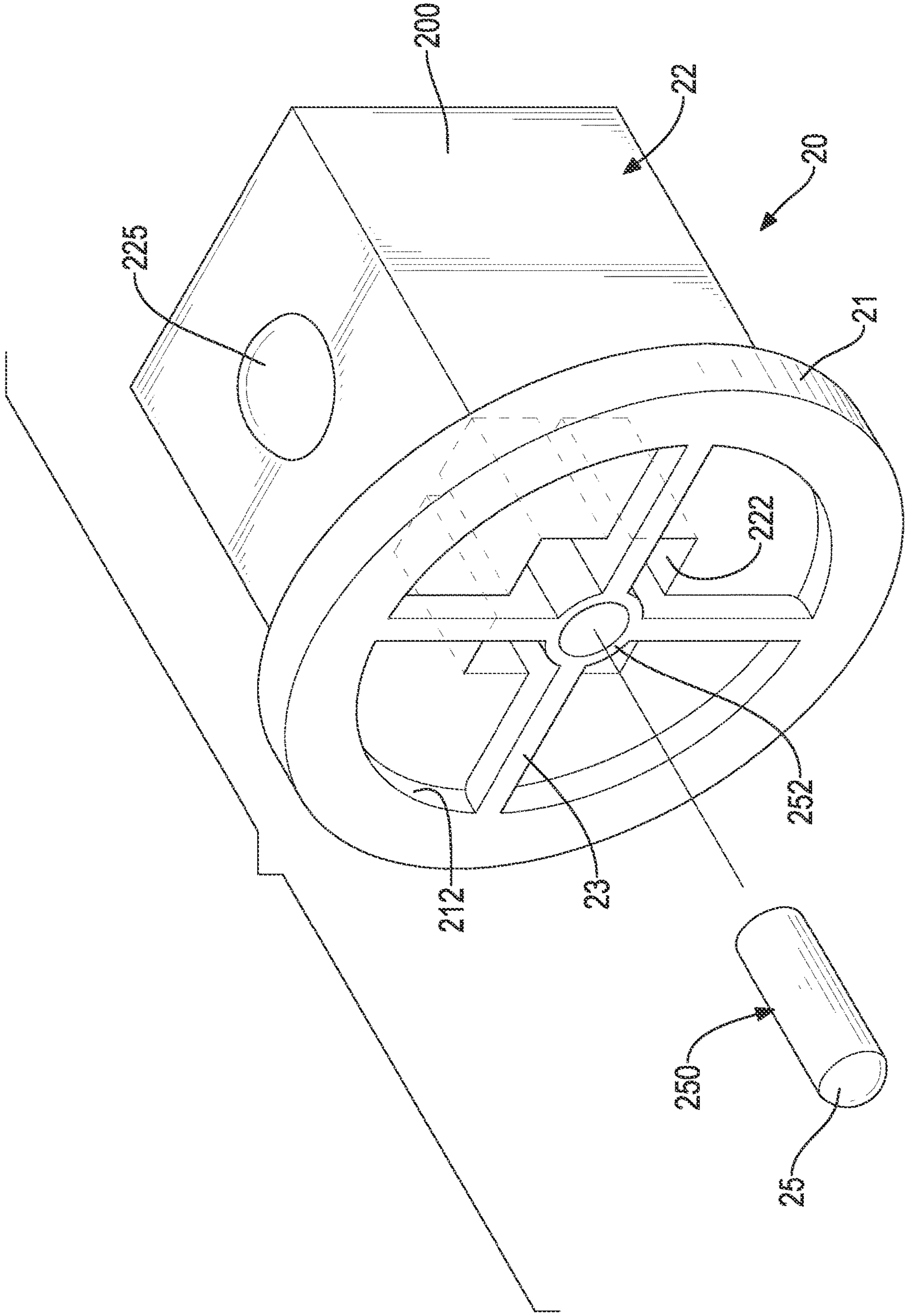
FIG. 3 is an exploded perspective view of a socket holding mount of the socket holding frame in FIG. 1.
Figure 4:
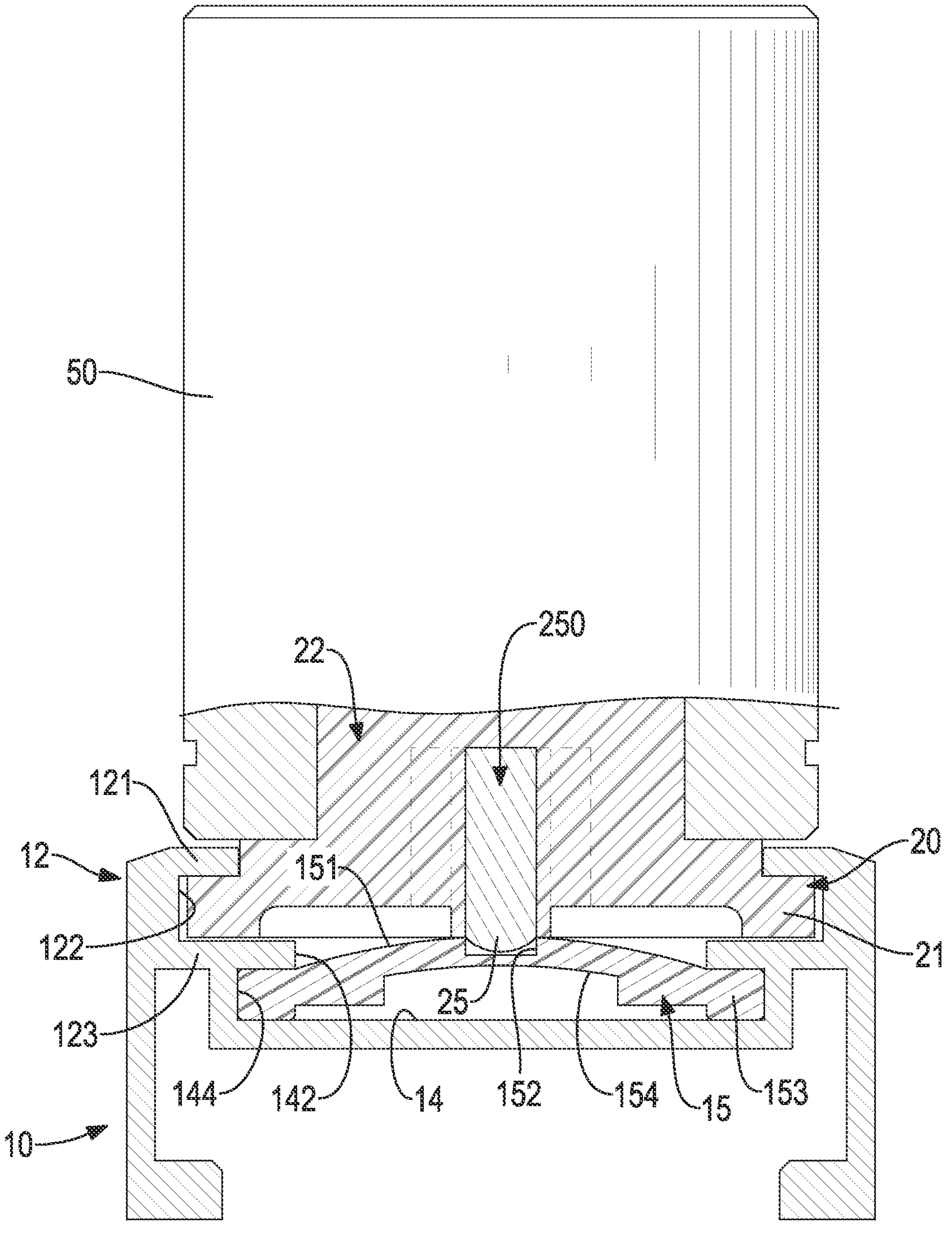
FIG. 4 is a side view in partial section of the socket holding frame in FIG. 1.
Figure 5:
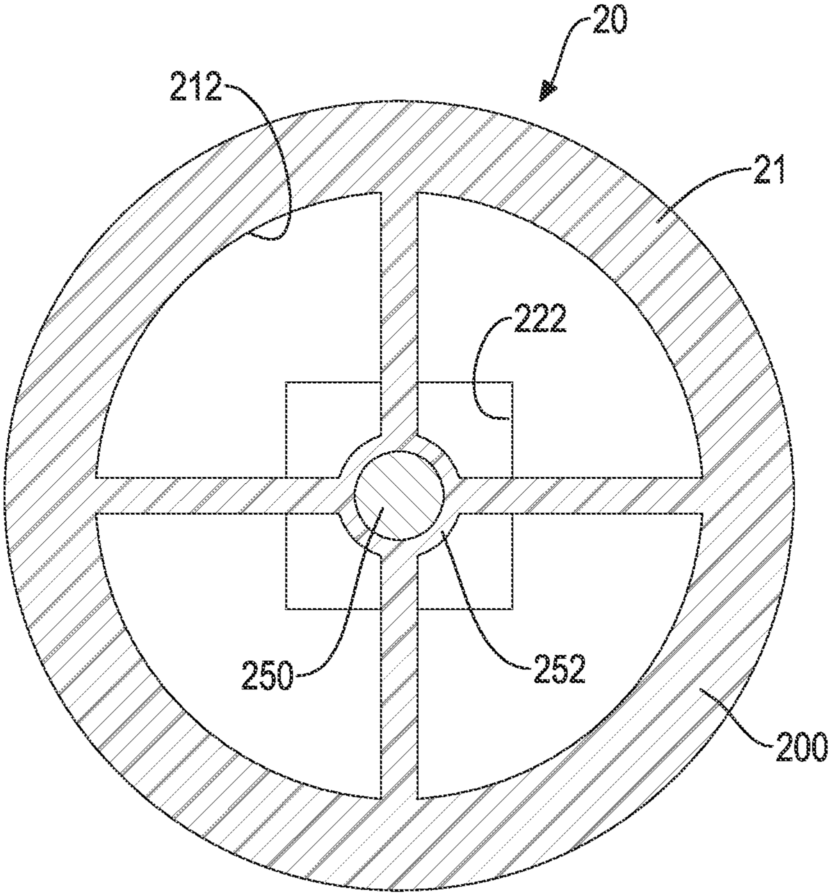

With reference to FIGS. 3 to 5, the socket holding mount 20 may comprise a body 200 and a positioning pin 250. The body 200 may be made of a plastic material. The flange 21 and part of the holding portion 22 are integrally formed at the body 200. The positioning pin 250 may be a round pin combined with the body 200 and has an end extending out from a bottom of the body 200. The positioning protrusion 25 is the end of the positioning pin 250 extending out from the bottom of the body 200. A hardness of the positioning pin 250 is larger than a hardness of the body 200. The positioning pin 250 may be a metal pin and is combined with the body 200 via insert molding or overmolding.

Preferably, a boss 252 is formed at the bottom of the body 200 and at a middle thereof. The positioning pin 250 is embedded into the boss 252 and has an end extending out of the boss 252. At least one depression 212 is recessed in the bottom of the body 200 and is formed between the boss 252 and the flange 21 to decrease a contacting area between the socket holding mount 20 and the positioning panel 15. At least one concavity 222 is formed around the boss 252 and extends into the holding portion 22 to decrease a volume and a weight of the socket holding mount 20. At least one rib 23 is radially connected to the boss 252 to increase structural strength of the body 200.

Figure 6:
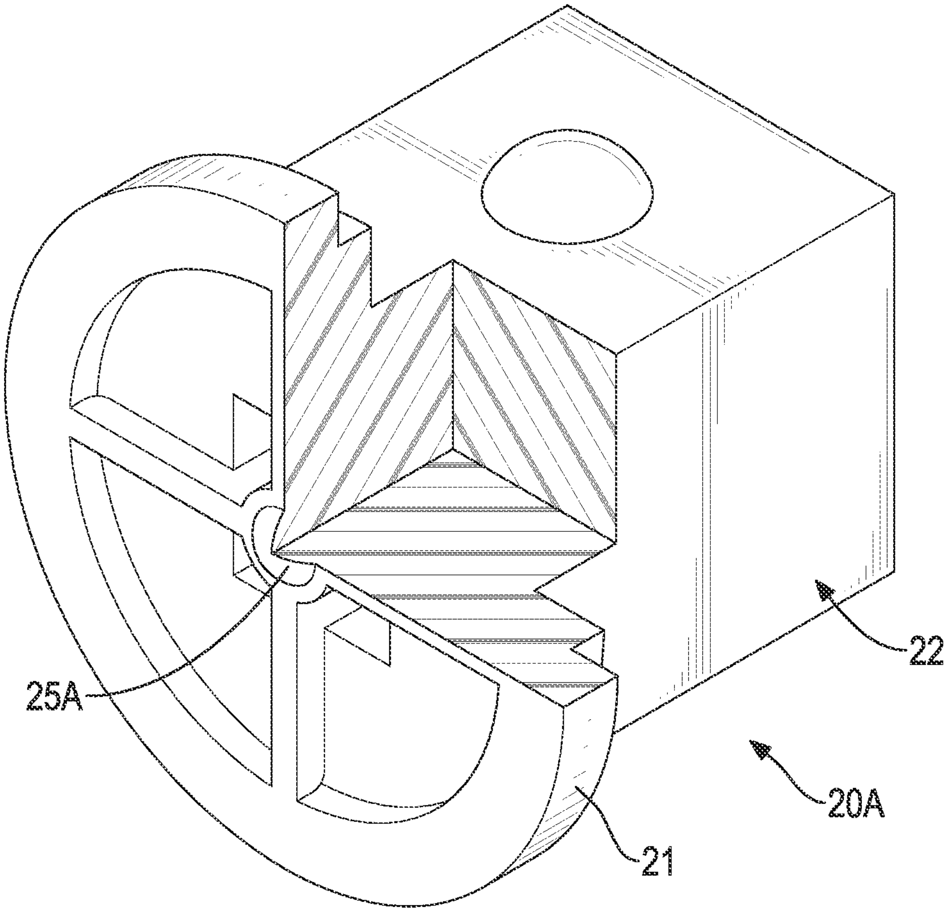
FIG. 6 is a perspective view in partial section of the socket holding mount of a second embodiment of the socket holding frame in accordance with the present invention.
Figure 7:
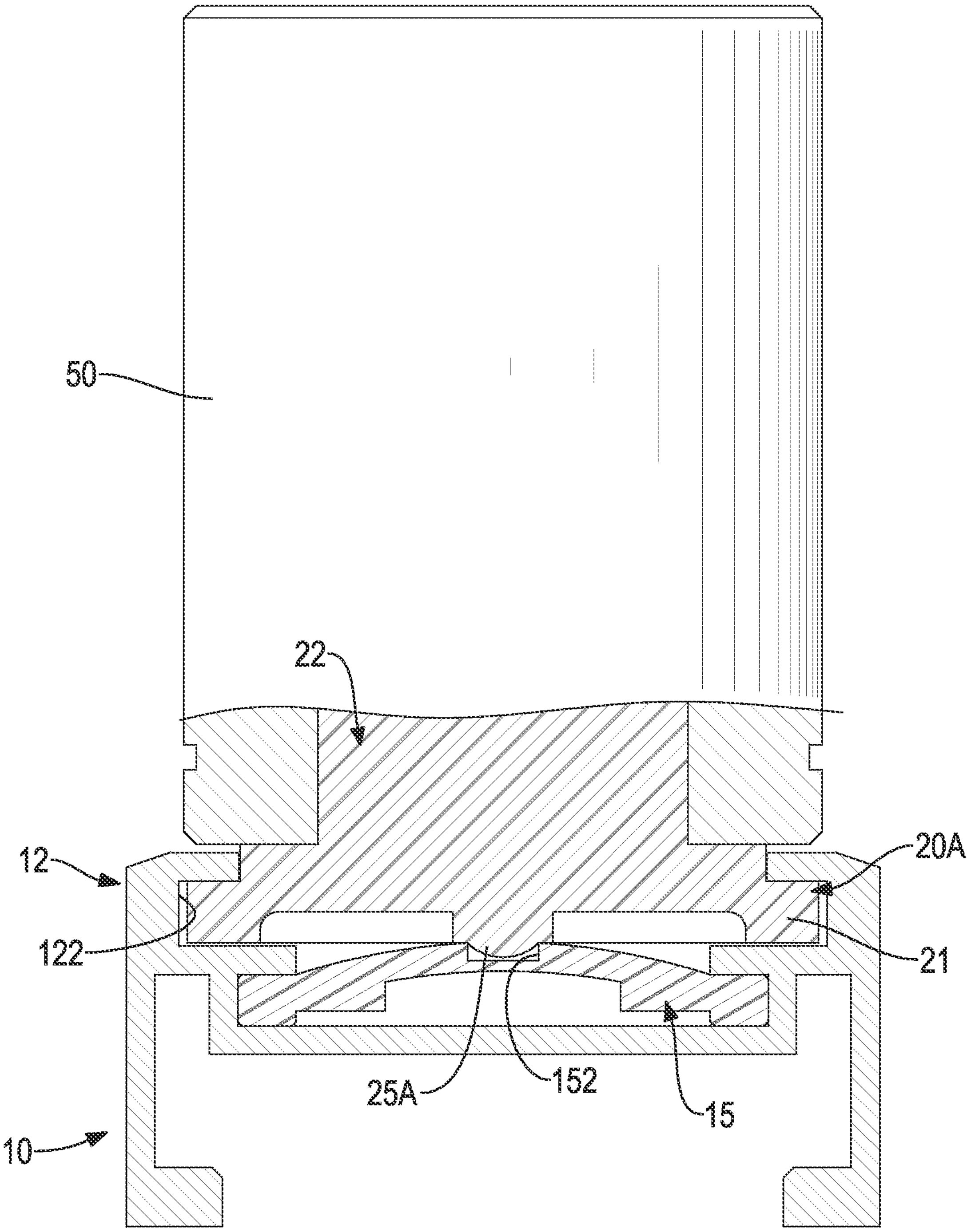
FIG. 7 is a side view in partial section of the socket holding frame in FIG. 6.

With reference to FIGS. 6 and 7, in the second embodiment, the positioning protrusion 25A is integrally formed with the flange 21 as a single piece.

Figure 8:
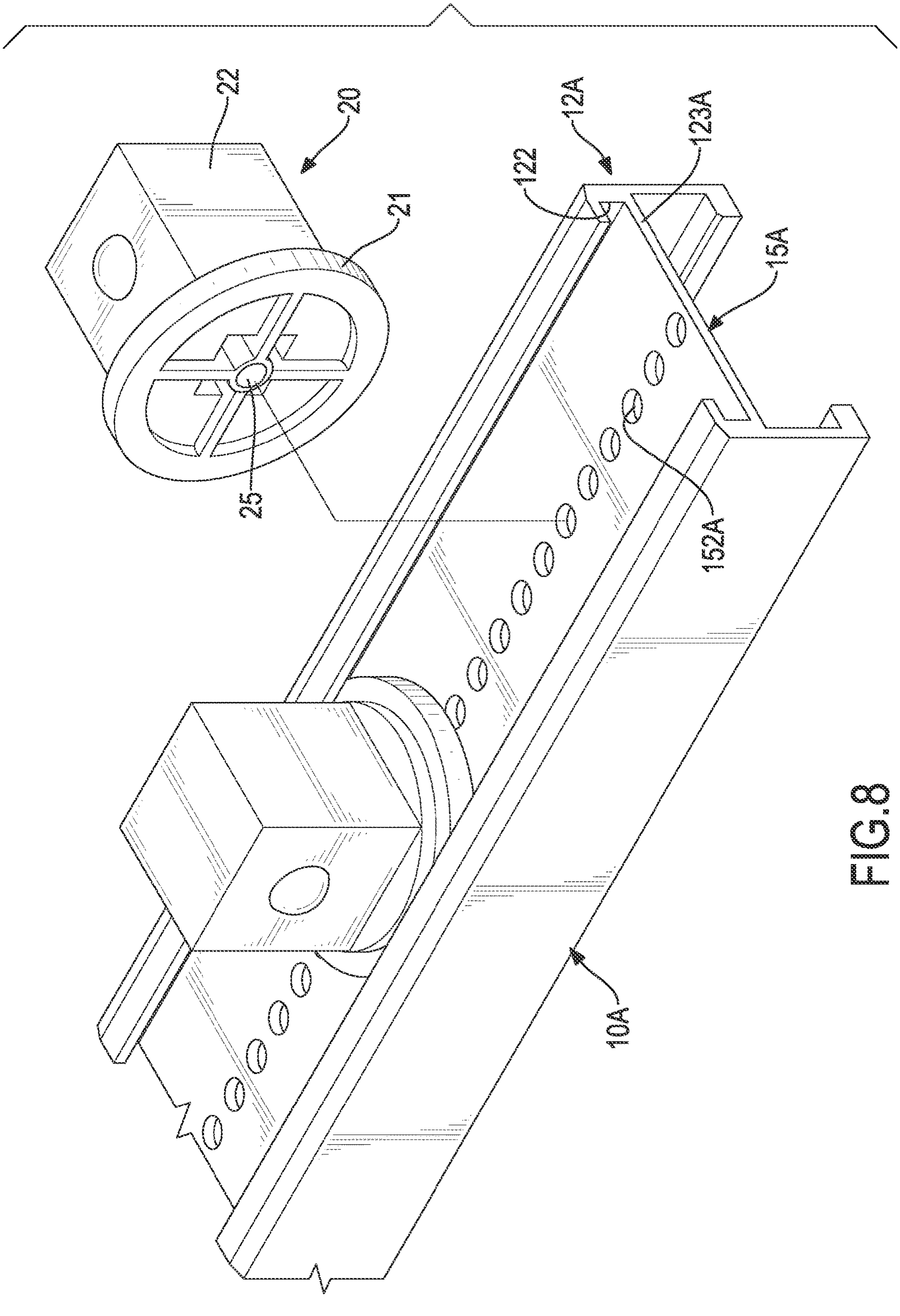
FIG. 8 is an exploded perspective view of a third embodiment of the socket holding frame in accordance with the present invention.
Figure 9:
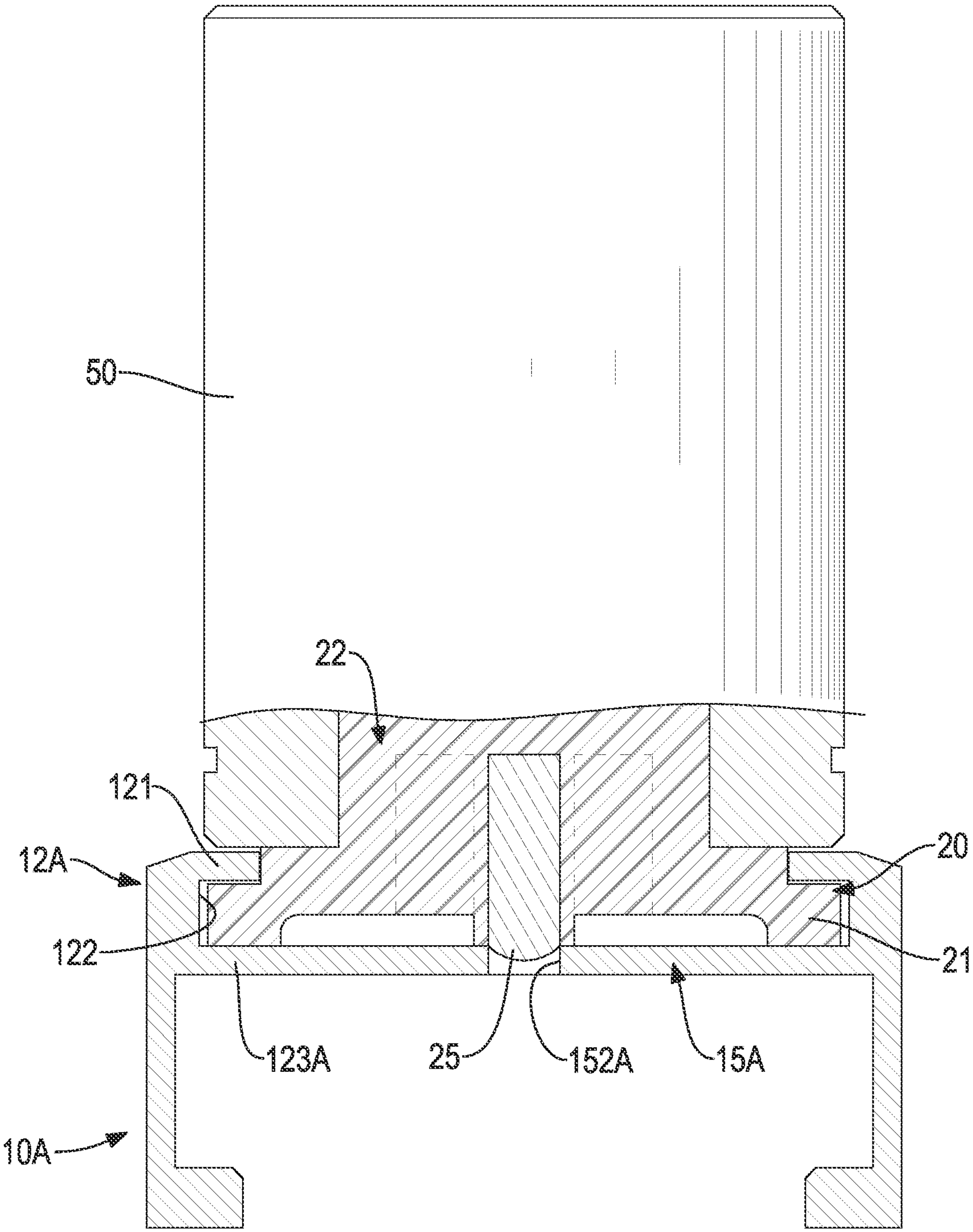
FIG. 9 is a side view in partial section of the socket holding frame in FIG. 8.

With reference to FIGS. 8 and 9, in the third embodiment, the track base 10A is an elongated rack and may be a metal rack. The two opposite sides of the positioning panel 15A are respectively connected with the lower rail panels 123A of the two side racks 12A. A top surface of the positioning panel 15A is level with the top surfaces of the lower rail panels 123A of the two side racks 12A. The locking holes 152A are formed through the positioning panel 15A.

With reference to FIGS. 1, 4, 7, and 9, the socket 50 is detachably mounted on and around the holding portion 22 of the socket holding mount 20, 20A. The engaging ball 225 engages with a recess in an interior surface of the socket 50. Consequently, the socket 50 is positioned on the holding portion 22 of the socket holding mount 20, 20A. To adjust the position of the socket 50 relative to the track base 10, 10A, the socket 50 with the socket holding mount 20, 20A is pushed to slide along the sliding channels 122 of the two side racks 12, 12A. The positioning protrusion 25, 25A of the socket holding mount 20, 20A is released from the locking hole 152, 152A engaging with the positioning protrusion 25, 25A by the pushing force. The positioning protrusion 25, 25A can be moved to and engage with the following locking holes 152, 152A one by one, till the socket 50 is moved to a desired position. When the socket 50 is moved to the desired position, the positioning protrusion 25, 25A engages with the locking hole 152, 152A at the desired position to hold the socket holding mount 20, 20A with the socket 50 in the desired position.

When a number or a mark on the socket 50 does not face the user for ease of identification, the user may rotate the socket 50 in a clockwise or counterclockwise direction relative to the track base 10, 10A to rotate the socket 50 with the socket holding mount 20, 20A around the positioning protrusion 25, 25A relative to the track base 10, 10A to enable the number or mark of the socket 50 to face the user. Because of the positioning protrusion 25, 25A extending into one of the locking holes 152, 152A of the positioning panel 15, 15A, during the above-mentioned rotating process, the socket 50 with the socket holding mount 20, 20A is firmly and stably held in position without sliding relative to the track base 10, 10A.

In addition, the positioning panel 15 may be a flexible panel and the highest point of the abutting portion 151 of the positioning panel 15 is located higher than the top surfaces of the lower rail panels 123 of the two side racks 12. After the socket 50 is rotated to a desired direction, the abutting position 151 of the positioning panel 15 pushes the flange 21 upwardly to tightly abut against the upper rail panels 121 of the two side racks 12. Therefore, the flange 21 is tightly clamped between the upper rail panels 121 and the positioning panel 15 and is prevented from being rotated.

The track base 10, 10A may be mounted with multiple said socket holding mounts 20, 20A to allow multiple said sockets 50 to be mounted on the multiple socket holding mounts 20, 20A.

With the arrangement of the locking holes 152, 152A of the positioning panel 15, 15A spaced apart from one another and aligned in a straight line and the positioning protrusion 25, 25A protruding from the bottom of the socket holding mount 20, 20A, while the socket holding mount 20, 20A is sliding along the sliding channels 122 of the two side racks 12, 12A, the positioning protrusion 25, 25A can extend into the locking holes 152, 152A one by one for detentedly moving the socket holding mount 20, 20A. The socket holding mount 20, 20A can be firmly and securely held in position and can be rotated relative to the track base 10, 10A around the positioning protrusion 25, 25A without sliding relative to the track base 10, 10A.

What is claimed is:

1. A socket holding frame comprising:

a track base having a positioning panel being elongated and having multiple round locking holes arranged at spaced intervals and aligned in a straight line; and two side racks respectively located at two opposite sides of the positioning panel, and each of the two side racks having an upper rail panel located higher than the positioning panel;

a lower rail panel; and a sliding channel formed between the upper rail panel and the lower rail panel and having an opening facing toward and communicating with the opening of the sliding channel of the other one of the two side racks;

a socket holding mount slidably and rotatably mounted on the track base and having a round flange disposed between the upper rail panels and the lower rail panels of the two side racks and extending into the sliding channels of the two side racks via diametrical opposite sides of the round flange, respectively, and being slidable relative to the sliding channels of the two side racks along the sliding channels;

a holding portion formed on and protruding upwardly from a top of the round flange and configured to hold a socket; and a single positioning protrusion formed at a bottom of the socket holding mount, extending out of a bottom surface of the round flange, being coaxial with the round flange, arranged at a flange center from which all points on a boundary of the round flange are equidistant, and selectively mounted into one of the locking holes;

wherein the socket holding mount is rotatable relative to the track base around the single positioning protrusion mounted into said one of the locking holes.

2. The socket holding frame as claimed in claim 1, wherein a lower end of the single positioning protrusion is convex.

3. The socket holding frame as claimed in claim 2, wherein an assembling cavity is located lower than the two side racks;

an upper opening is formed between the lower rail panels of the two side racks and communicates with the assembling cavity; and the positioning panel is an elongated panel disposed in the assembling cavity.

4. The socket holding frame as claimed in claim 3, wherein the positioning panel has an abutting portion having a convex surface facing upward and extending into the upper opening; and the multiple locking holes are formed in the abutting portion of the positioning panel.

5. The socket holding frame as claimed in claim 4, wherein a highest point of the abutting portion of the positioning panel is located higher than top surfaces of the lower rail panels of the two side racks.

6. The socket holding frame as claimed in claim 2, wherein the two opposite sides of the positioning panel are respectively connected with the lower rail panels of the two side racks.

7. The socket holding frame as claimed in claim 1, wherein the single positioning protrusion of the socket holding mount is formed integrally with the round flange of the socket holding mount as a single piece.

8. The socket holding frame as claimed in claim 2, wherein the single positioning protrusion of the socket holding mount is formed integrally with the round flange of the socket holding mount as a single piece.

9. The socket holding frame as claimed in claim 3, wherein the single positioning protrusion of the socket holding mount is formed integrally with the round flange of the socket holding mount as a single piece.

10. The socket holding frame as claimed in claim 4, wherein the single positioning protrusion of the socket holding mount is formed integrally with the round flange of the socket holding mount as a single piece.

11. The socket holding frame as claimed in claim 5, wherein the single positioning protrusion of the socket holding mount is formed integrally with the round flange of the socket holding mount as a single piece.

12. The socket holding frame as claimed in claim 6, wherein the single positioning protrusion of the socket holding mount is formed integrally with the round flange of the socket holding mount as a single piece.

* * * * *